United States Patent
Sakurai et al.

(10) Patent No.: US 6,771,039 B2
(45) Date of Patent: Aug. 3, 2004

(54) MOTOR CONTROL APPARATUS AND METHOD

(75) Inventors: Yoshimi Sakurai, Hitachiota (JP); Yoshitaka Iwaji, Hitachi (JP); Ryoso Masaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 10/329,438

(22) Filed: Dec. 27, 2002

(65) Prior Publication Data

US 2003/0128009 A1 Jul. 10, 2003

(30) Foreign Application Priority Data

Dec. 27, 2001 (JP) ........................................ 2001-395632

(51) Int. Cl.[7] .............................................. H02P 1/46
(52) U.S. Cl. ....................... 318/722; 318/700; 318/714; 318/715
(58) Field of Search ............................... 318/700, 714, 318/715, 722

(56) References Cited

U.S. PATENT DOCUMENTS

| | | | | |
|---|---|---|---|---|
| 4,275,343 A | * | 6/1981 | Fulton et al. ............... | 318/721 |
| 5,334,917 A | * | 8/1994 | Lind ........................... | 318/254 |
| 5,663,625 A | * | 9/1997 | Sato et al. .................. | 318/701 |
| 5,936,378 A | * | 8/1999 | Iijima et al. ................ | 318/807 |
| 5,986,419 A | * | 11/1999 | Archer et al. ............... | 318/254 |
| 6,018,225 A | * | 1/2000 | Garces ........................ | 318/798 |
| RE37,360 E | * | 9/2001 | Duncan ....................... | 318/281 |

FOREIGN PATENT DOCUMENTS

JP A-8-256496 10/1996

* cited by examiner

Primary Examiner—Rita Leykin
(74) Attorney, Agent, or Firm—Crowell & Moring LLP

(57) ABSTRACT

A motor control apparatus includes an inverter for applying voltage to a synchronous motor and a control apparatus 4 for calculating a voltage instruction value to be applied by a PWM signal. There are provided a current difference sensing unit of the synchronous motor, a current difference calculation unit for calculating a current change attributed to the voltage applied, and a position sensing unit for estimating a counter electromotive force direction according to the current change sensed by the current change sensing unit and the current change calculated by the current difference calculation unit. The magnetic pole position of the rotor of the synchronous motor is estimated according to the counter electromotive force direction estimated by the position sensing unit and the voltage applied to the synchronous motor is controlled according to the estimated magnetic pole position.

14 Claims, 6 Drawing Sheets

US 6,771,039 B2

MOTOR CONTROL APPARATUS AND METHOD

BACKGROUND OF THE INVENTION

The present invention relates to a motor control apparatus and control method for controlling speed or torque of an AC motor such as a synchronous motor and a reluctance motor.

The speed or torque of the AC motor such as the synchronous motor and the reluctance motor is controlled by current control or voltage control based on the rotor magnetic pole position. Recently, as a speed or torque control method of an AC motor, there have been suggested various magnetic pole position sensor-less control methods for controlling without sensing the rotor magnetic pole position by a position sensor (controlling by estimating the rotor magnetic pole position). For example, Japanese Patent Laid Open Publication No. 8-256496 discloses a technique for estimating a counter electromotive force (induced voltage) introduced from a motor voltage/current equation, from the applied voltage and motor current and estimating the rotor magnetic pole position from this estimated counter electromotive force.

However, in the aforementioned conventional technique, it is difficult to instantaneously estimate the direction of the counter electromotive force and there is a limit to enhance the response of the motor control system. That is, in the aforementioned conventional technique, in order to eliminate effect of the current pulsation attributed to inverter switching operation (noise caused by an external disturbance due to an inverter mixed in applied current), a noise filter is used to suppress the current pulsation. For this, in the aforementioned conventional technique, instead of using current differentiation in the motor voltage/current equation, the counter electromotive force is calculated by using an observer for adjusting the response by the feedback gain based on the observer theory. Accordingly, in the aforementioned conventional technique, it is difficult to instantaneously estimate the direction of the counter electromotive force and there remains a limit to enhance the response of the motor control system.

SUMMARY OF THE INVENTION

It is therefore an object of the present invention to provide a motor control apparatus and control method capable of controlling an AC motor with a high response without using a position sensor. Another object of the present invention is to provide a motor control apparatus and control method capable of controlling an AC motor having a salient pole with a high response without using a position sensor. Still another object of the present invention is to provide a motor control apparatus and control method capable of increasing the drive efficiency in the intermediate speed range to the high speed range of the drive system using the AC motor.

The present invention is characterized in that a counter electromotive force is estimated according to a current change of an AC motor and a current change by the applied voltage. Accordingly, the present invention includes a control apparatus controlling voltage applied to an AC motor from a power converter and having current change sensing means for sensing a current change of the AC motor, current change calculation means for calculating a current change by the voltage applied to the AC motor from the power converter, and counter electromotive force estimating means for estimating a counter electromotive force according to the current change sensed by the current change sensing means and the current change calculated by the current change calculation means. When the AC motor is a synchronous motor having a salient pole, the current change calculation means calculates a current change by the voltage applied to the synchronous motor from the power converter and also calculates a current change by the inductance changed by rotation of the synchronous motor.

Moreover, the control apparatus has correction means for correcting the current change calculated by the current change calculation means according to the input voltage of the power converter. The current change sensing means senses a current change at a timing when the affect of current change changed by the power converter switching operation is removed. The current change calculation means calculates a current change by receiving an applied voltage instruction calculated before sensing the current change by the current change sensing means.

According to the present invention, the magnetic pole position of a rotor of an AC motor is estimated according to an estimated counter electromotive force direction and voltage applied to the AC motor from the power converter is controlled according to this estimated magnetic pole position.

Other objects, features and advantages of the invention will become apparent from the following description of the embodiments of the invention taken in conjunction with the accompanying drawings.

DESCRIPTION OF THE EMBODIMENTS

Description will now be directed embodiments of the present invention with reference to the attached drawings.

Figure 1:
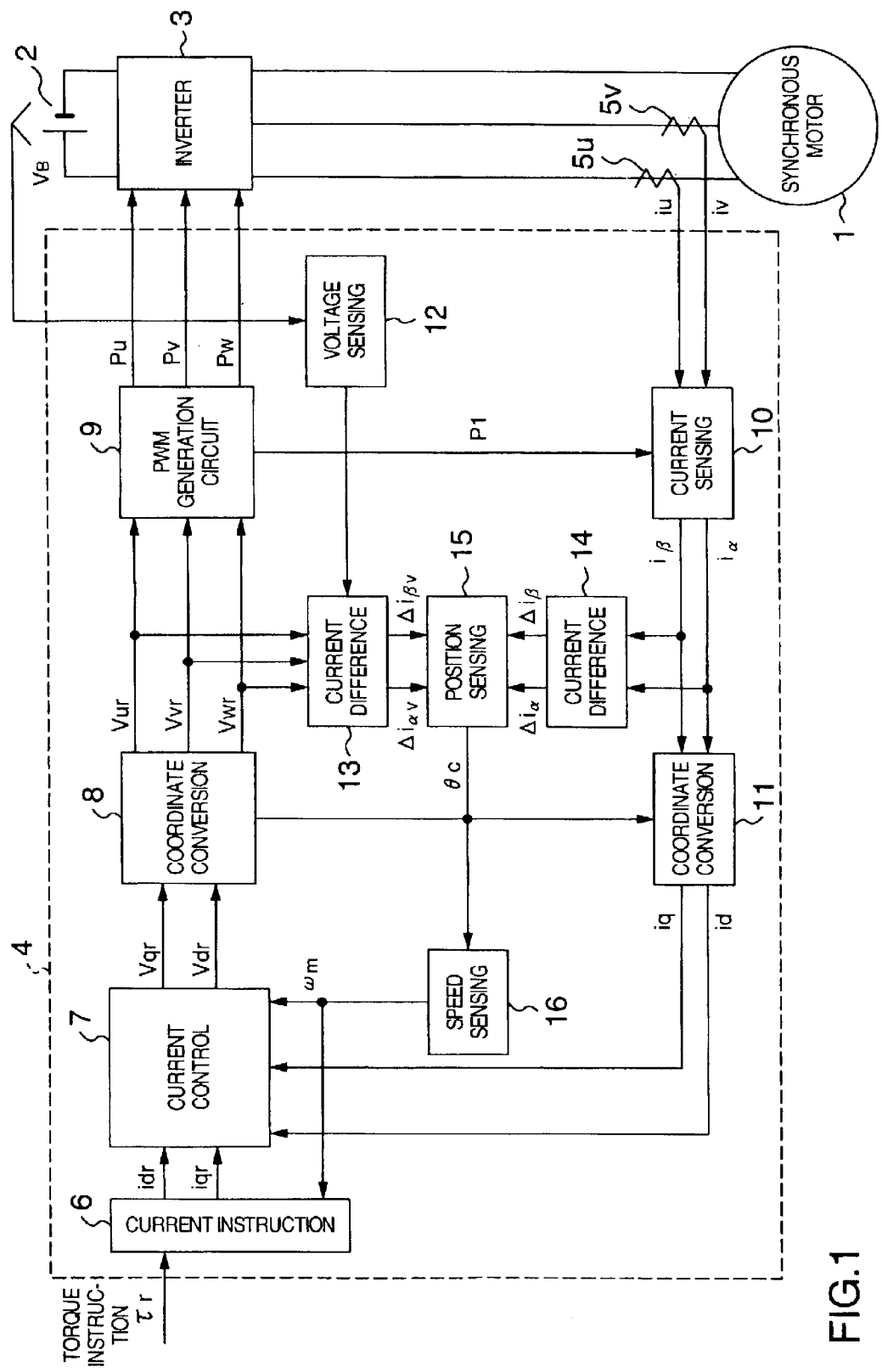
FIG. 1 is a block diagram showing system configuration of a motor control apparatus according to a first embodiment of the present invention, i.e., a control system example for performing torque control of a cylindrical pole type synchronous motor with high efficiency without using a position sensor.

FIG. 1 shows system configuration of a motor control apparatus according to a first embodiment of the present invention. The motor control apparatus according to the present embodiment is used in a hybrid electric automobile drive system for driving an automobile by switching between an engine which is an internal combustion engine and a synchronous motor which is an AC motor as drive sources. For a torque instruction received from an upper node control unit, for example, from a control unit of an engine which is the internal combustion engine, the torque of the synchronous motor is controlled with high efficiency in position sensor-less mode, i.e., without sensing the magnetic pole position of the rotor by a position sensor.

In FIG. 1, 1 denotes a cylindrical synchronous motor. The synchronous motor 1 is an AC motor having non-salient pole type rotor having a plurality of permanent magnets arranged at an identical interval in a circular shape in an iron core or on an outer circumference. DC voltage supplied from a battery 2 which is accumulator means placed on a vehicle is converted into 3-phase AC voltage by an inverter 3 as a power converter and applied. The inverter 3 is composed of a power switching element such as IGBTs and MOS-FETs. The power switching element is controlled to be ON/OFF according too the PWM signal output from a control apparatus 4. Thus, application voltage from the inverter 3 to the synchronous motor 1 is controlled.

The control apparatus 4 controls the application voltage of the synchronous motor 1 according to a torque instruction τr input from outside. The torque instruction τr is input to a current instruction generation unit 6 together with the motor speed ω obtained by a method described later. The current instruction generation unit 6 calculates a d-axis current instruction idr and a q-axis current instruction iqr optimal for generating a motor torque as the torque instruction τr by the motor speed ω at the moment when the motor speed is obtained and outputs the calculation result to a current control unit 7. Here, if the d-axis current and the q-axis current minimizing the loss at the operation point of the specified AC motor are defined as the optimal d-axis and q-axis current, the optimal d-axis and q-axis current instruction mean those calculated from the optimal d-axis and q-axis current obtained calculation or experiment, for example, and mapped.

The current control unit 7 calculates a difference between the d-axis current instruction idr input and the d-axis current id detected and fed back and a difference between the q-axis current instruction iqr input and the q-axis current iq detected and fed back. And according to these differences, the d-axis and q-axis current control calculation value is calculated. Moreover, according to the motor speed ω input, the current control unit 7 calculates the d-axis and q-axis interference voltage component of the synchronous motor. In the current control unit 7, the d-axis interference voltage component is added to the d-axis current control calculation value, and the q-axis interference voltage component is added to the q-axis current control calculation value. The addition results are output as the d-axis voltage instruction Vdr and the q-axis voltage instruction Vqr to a coordinate conversion unit 8.

It should be noted that the d-axis current id and the q-axis current iq are calculated as follows. The u-phase current iu and the v-phase current iv of the synchronous motor sensed by the current sensor 5u and 5v are input to a current sensing unit 10 at the timing of the sampling timing pulse P1 from a PWM generation circuit 9 which will be detailed later. The u-phase current iu and the v-phase current iv input are coordinate-converted by the input magnetic pole position θc in a coordinate conversion unit 11. Here, the magnetic pole position θc input to the coordinate conversion unit 11 is obtained by the sensing method which is a characteristic feature of the present embodiment and will be detailed later.

In the coordinate conversion unit 8, according to the magnetic pole position θc input, the d-axis voltage instruction Vdr and the q-axis voltage instruction Vqr of the d-q axis coordinate system are converted into a u-phase voltage instruction Vur, a v-phase voltage instruction Vvr, and w-phase voltage instruction Vwr which are voltages of a still coordinate system and output to the PWM generation circuit 9. The PWM generation circuit 9 generates PWM signals Pu, Pv, and Pw corresponding to the voltage instruction values Vur, Vvr, and Vwr of respective phases input and outputs them to the inverter 3. In the inverter 3, the power switch element is controlled to be ON/OFF according to the PWM signals Pu, Pv, and Pw input. This controls the output voltage of the inverter 3, i.e., voltage applied to the synchronous motor 1.

Figure 2:
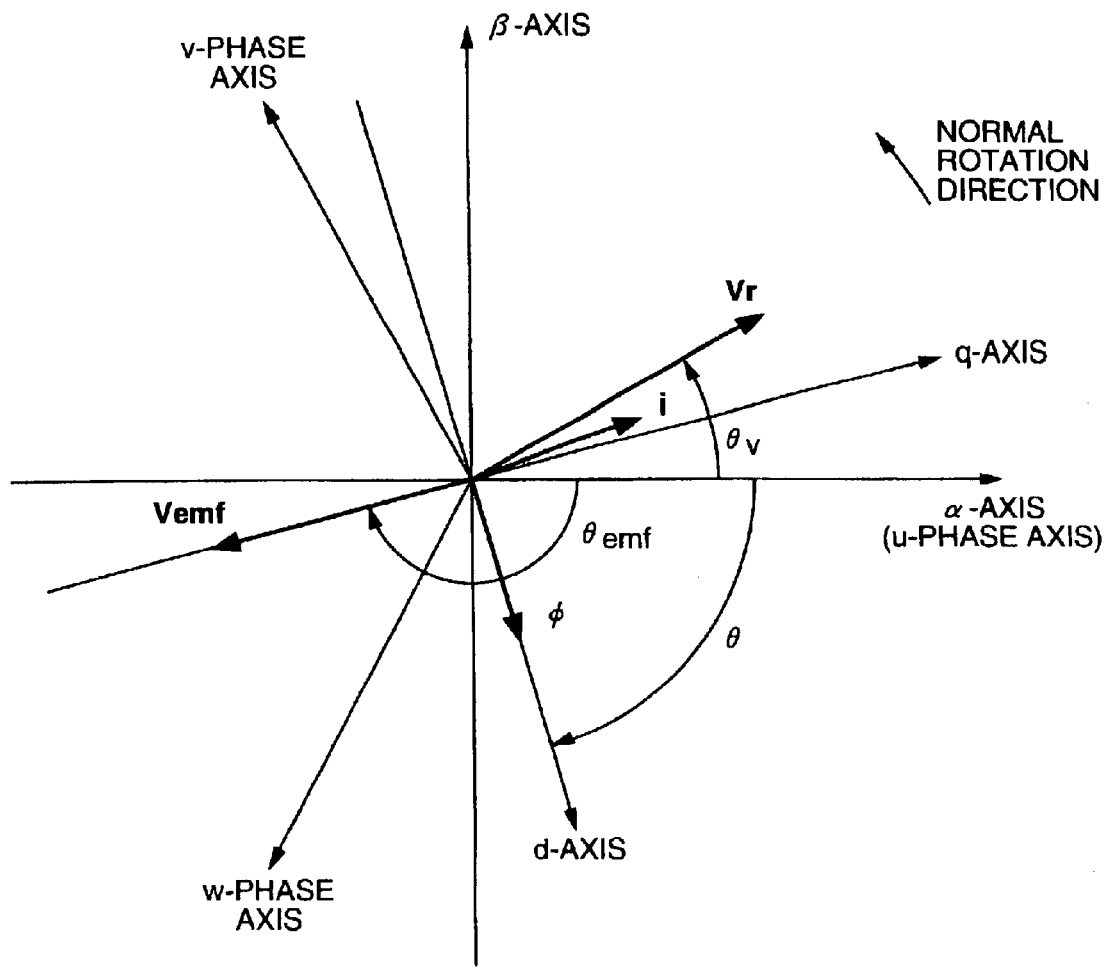
FIG. 2 shows relationships between vectors when the asynchronous motor is driving, including a d axis of d-q axis coordinate system present in the fourth quadrant of the still coordinate system having α axis as a horizontal axis and β axis as a vertical axis, and the relationship of a current vector i and a voltage instruction vector Vr when the magnetic pole position θ of the rotor of the asynchronous motor against the a axis is in the −80 degrees direction.
Figure 3:
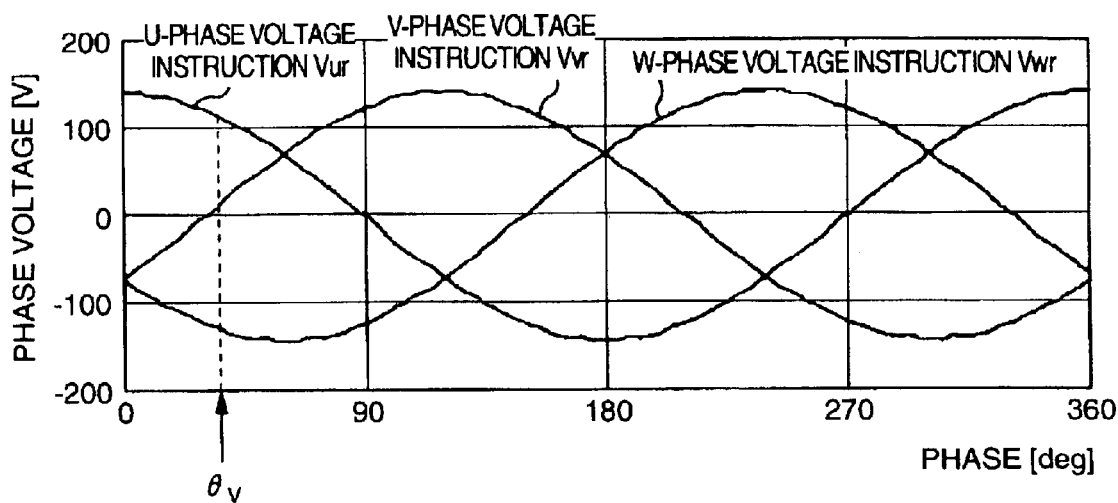
FIG. 3 is a waveform diagram showing the relationship between the three-phase voltage instructions Vur, Vvr, and Vwr and the voltage phase θv when the horizontal axis represents the phase (deg) and the vertical axis represents phase voltage (V).

FIG. 2 shows the relationships of vectors when the synchronous motor 1 is driving. More specifically, FIG. 2 shows a still coordinate system having α-axis as a horizontal axis and β-axis as a vertical axis, wherein relationships of vectors are shown when d-axis of the d-q axis coordinate system is in the fourth quadrant and the magnetic pole position θ of the rotor of the synchronous motor with respect to the α-axis is in the direction of −80 degrees. Here, the counter electromotive force vector Vemf is positioned in the negative direction of the q-axis (third quadrant). The voltages of the voltage instructions Vur, Vvr, and Vwr in the voltage phase θv in the state of FIG. 2 are shown in FIG. 3. FIG. 3 shows the relationship between the voltage waveform of the voltage instructions Vur, Vvr, and Vwr and the phase when the horizontal axis represents the phase (deg) and the vertical axis represents the phase voltage (V).

Here, i represents a synthesized current vector of current vectors iu, iv, and iw flowing in each phase of the synchronous motor 1; Vr represents a synthesized voltage instruction vector of the voltage instruction vectors Vur, Vvr, and Vwr of each phase; Vemf represents a counter electromotive force synthesizing the counter electromotive force vectors of each phase of the synchronous motor 1; and Φ represents a magnetic flux vector indicating a magnetic flux generated by the permanent magnet of the rotor of the synchronous motor 1. θemf represents a phase of the counter electromotive force vector Vemf with respect to the α-axis; and θv represents a voltage phase of the voltage instruction vector Vr with respect to the α-axis. It should be noted that the u-phase axis, the v-phase axis, and the w-phase axis on the still coordinate system are coordinate axes of each of the three phases of the synchronous motor 1 arranged at an interval of 120 degrees.

Figure 4:
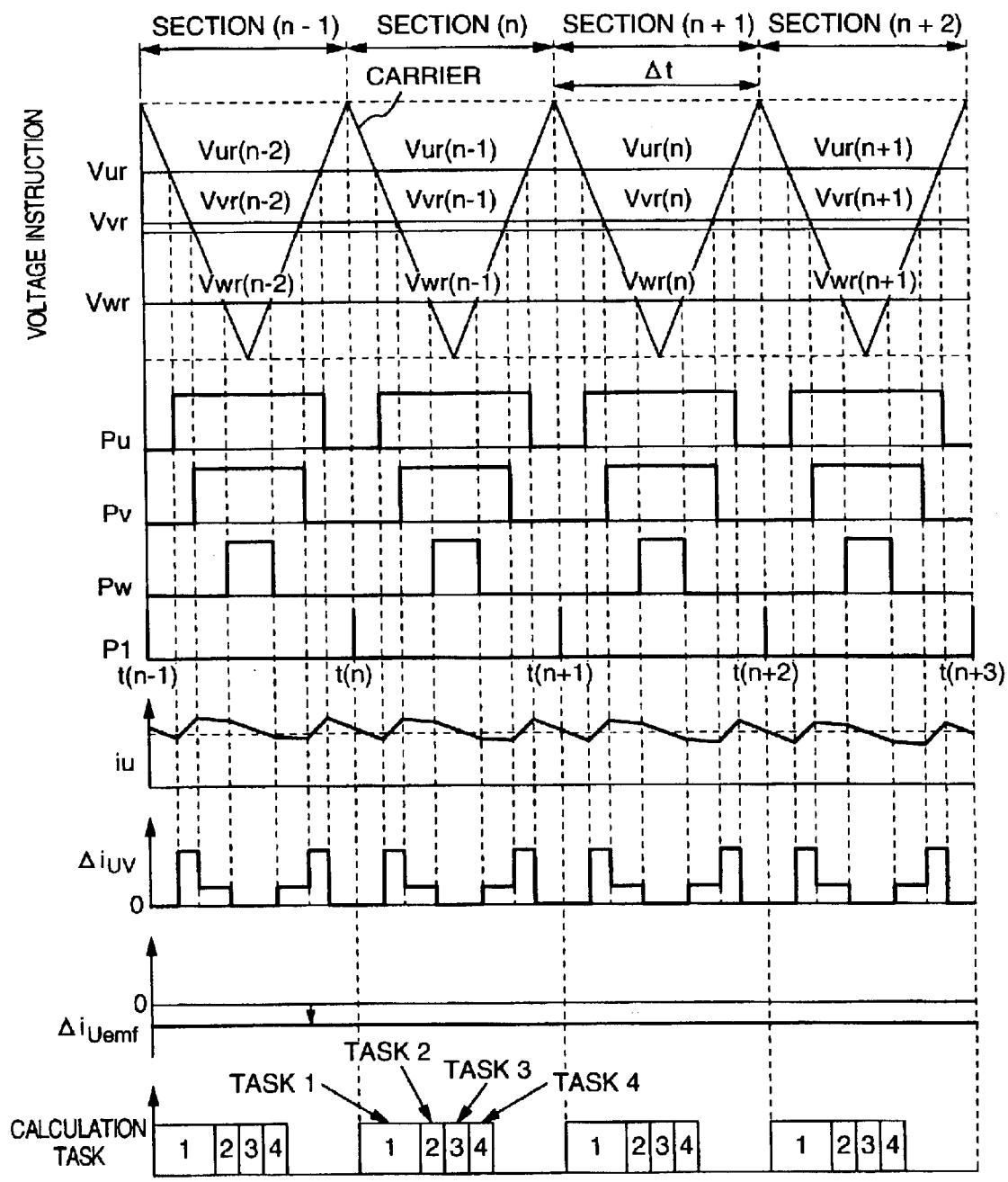
FIG. 4 is a time chart showing relationships between the carrier signal when the voltage phase is v, PWM signals of the respective phases Pu, Pv, and Pw, generation states of voltage instruction values of each phase Vur, Vvr, and Vwr, and a current change state at the u phase.

FIG. 4 shows relationships between the carrier signal when the voltage phase is θv, generation state of the PWM signals of each phase Pu, Pv, and Pw and voltage instruction values of each phase Vur, Vvr, and Vwr, and the current change state at the phase u. For the voltage instruction values of each phase Vur, Vvr, and Vwr, new values are calculated at the vertex of a triangle wave in which the carrier signal becomes maximum such as t(n−1), t(n), and t(n+1) and the new values calculated are set. Moreover, the PWM signals of each phase Pu, Pv, and Pw are obtained by comparing the voltage instruction values Vur, Vvr, and Vwr of each phase with the carrier signal. If the PWM signal is applied to the inverter 3 in this state, the current waveform of each phase pulsates according to the switching operation of the power switching element of the inverter 3. This is because when the PWM signal in a certain phase is high, the terminal voltage of the synchronous motor 1 in that phase becomes voltage of the positive electrode of the battery 2 and when the PWM signal is low, the terminal voltage of the synchronous motor 1 in that phase becomes voltage of the negative electrode of the battery 2. Accordingly, as shown in FIG. 4, the waveform of the u-phase current iu pulsates according to the switching operation of the power switching element of the inverter 3.

In the PWM generation circuit 9, at the moment when the carrier becomes maximum, a sampling timing pulse P1 is generated. As has been described above, in this embodiment, the sampling timing pulse P1 is input to the current sensing unit 10 so as to sense the u-phase current iu, and the v-phase current iv. At the interval when the sampling timing pulse P1 is generated, for example at a section (n−1) from time t(n−1) to t(n), average voltages of each phase applied to the synchronous motor 1 Vu, Vv, and Vw become equal to the voltage instruction values of each phase Vur(n−2), Vvr(n−2), and Vwr(n−2) calculated at the section (n−2). Accordingly, the phase current pulsates. However, the u-phase current difference $\Delta iu(n)$ between the u-phase current iu(n−1) at time t(n−1) and the u-phase current iu(n) at time t(n) is determined by the average voltage of each phase Vu, Vv, and Vw applied at section (n−1) and an average value of the counter electromotive force vector at that time. That is, $\Delta iu(n)$ is affected by the voltage instruction values Vur(n−2), Vvr(n−2), and Vwr(n−2) and an average value of the counter electromotive force vector.

When this relationship is explained by using the voltage/current equation of the synchronous motor in the still coordinate system, the voltage/current equation of the synchronous motor will be as follows.

$$V = Ri + L\, di/dt + j\omega m\phi \quad (1)$$
$$= Ri + L\, di/dt + Vemf$$

wherein V is a voltage vector applied, i is a current vector, $\phi$ is a magnetic flux vector, R is resistance, L is inductance, $\omega m$ is a motor speed, Vemf is a counter electromotive force vector, and j is a unit vector $\exp\{-j(\pi/2)\}$. Equation (1) can be approximated to the current difference $\Delta i$ as follows.

$$\Delta i = (V - Ri - Vemf)\Delta t/L \quad (2)$$

wherein $\Delta t$ is a sampling time, and $\Delta i$ is a current difference vector at the sampling time interval. Furthermore, when the resistance R is small, approximation as follows can be performed.

$$\Delta i = (\Delta t/L)V - (\Delta t/L)Vemf \quad (3)$$
$$= \Delta iv + \Delta iemf$$

As is clear from Equation (3), the current difference vector $\Delta i$ can be divided into current difference vector $\Delta iv$ for the applied voltage by the first term applied voltage vector and the current difference vector $\Delta iemf$ for the counter electromotive force by the counter electromotive vector. $\Delta iemf$ is a vector of identical direction as the Vemf and directed in the negative direction of q axis.

Here, the u-phase component $\Delta iuv$ and $\Delta iuemf$ of $\Delta iv$ and $\Delta iemf$ have waveforms as shown in FIG. 4. As is clear from FIG. 4, the iu increases when the sum of $\Delta iuv$ and $\Delta iuemf$ is positive and the iu decreases when the sum is negative. Moreover, the sum of the average value of $\Delta iuv$ and the average value of $\Delta iuemf$ in section (n−1) becomes $\Delta iu(n)$. Thus, by sensing the $\Delta i$ from the actually flowing current and calculating the $\Delta iv$ from the voltage instruction values of each phase Vur, Vvr, and Vwr, it is possible to obtain $\Delta iemf$. In this embodiment, the counter electromotive force of the synchronous motor 1 is estimated according to the aforementioned way of thinking and from this estimated counter electromotive force, magnetic pole position of the rotor of the synchronous motor 1 is estimated.

Next, explanation will be given on estimation of a magnetic pole position of the rotor of the synchronous motor 1 in the control apparatus 4 performing digital calculation. In FIG. 1, 13 denotes a current difference calculation unit. The current difference calculation unit 13 calculates an $\alpha$-axis voltage current difference $\Delta i\alpha v$ and a $\beta$-axis voltage current difference $\Delta i\beta v$ corresponding to the actual $\alpha$-axis application voltage and the $\beta$-axis application voltage according to the voltage instruction values Vur, Vvr, and Vwr output from the coordinate conversion unit 8. The inverter 3 is supplied with power from the battery 2 which is a DC power source and the battery voltage VB may change drastically. For this, the battery voltage VB is sensed by the voltage sensing unit 12 and input to the current difference calculation unit 13.

14 denotes a current difference sensing unit. The current difference sensing unit 14 inputs $\alpha$-axis current $\Delta i\alpha$ and $\beta$-axis current $\Delta i\beta$ output by converting iu and iv acquired at the timing when the sampling timing pulse P1 is generated in the current sensing unit 10 and calculates the $\alpha$-axis current difference $\Delta i\alpha$ and the $\beta$-axis current difference $\Delta i\beta$.

15 denotes a position sensing unit. The position sensing unit 15 inputs the $\alpha$-axis voltage current difference $\Delta i\alpha v$ and the $\beta$-axis voltage current difference $\Delta i\beta v$ which have been calculated by the current difference calculation unit 13 and the $\alpha$-axis current difference $\Delta i\alpha$ and the $\beta$-axis current difference $\Delta i\beta$ which have been calculated by the current difference sensing unit 14, thereby calculating the magnetic pole position $\theta c$ of the rotor of the synchronous motor 1.

Figure 5:
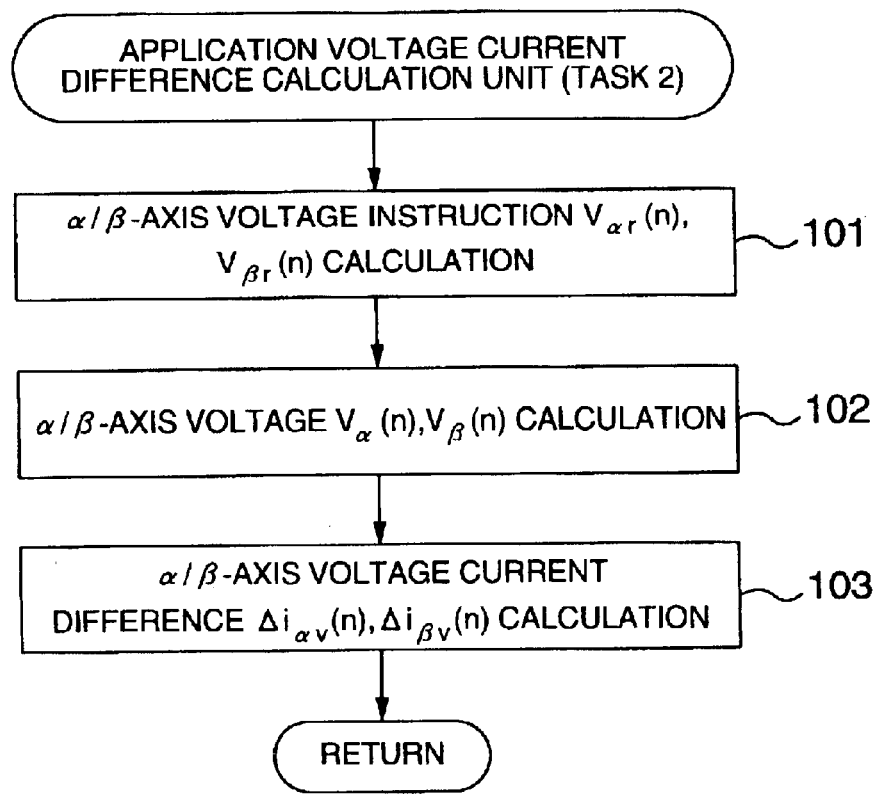
FIG. 5 is a flowchart showing processes performed by a current difference calculation unit of FIG. 1.
Figure 6:
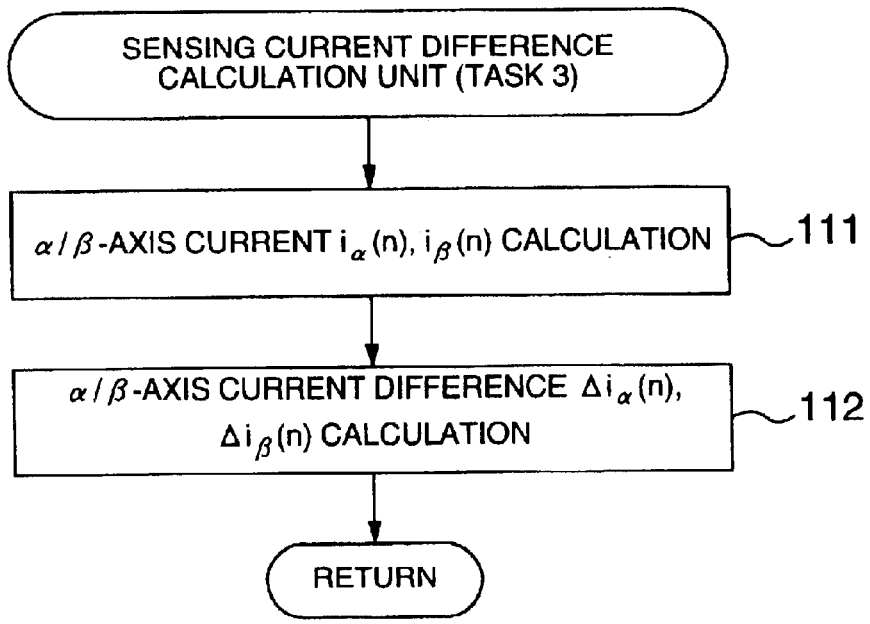
FIG. 6 is a flowchart showing processes performed by a current difference sensing unit of FIG. 1.
Figure 7:
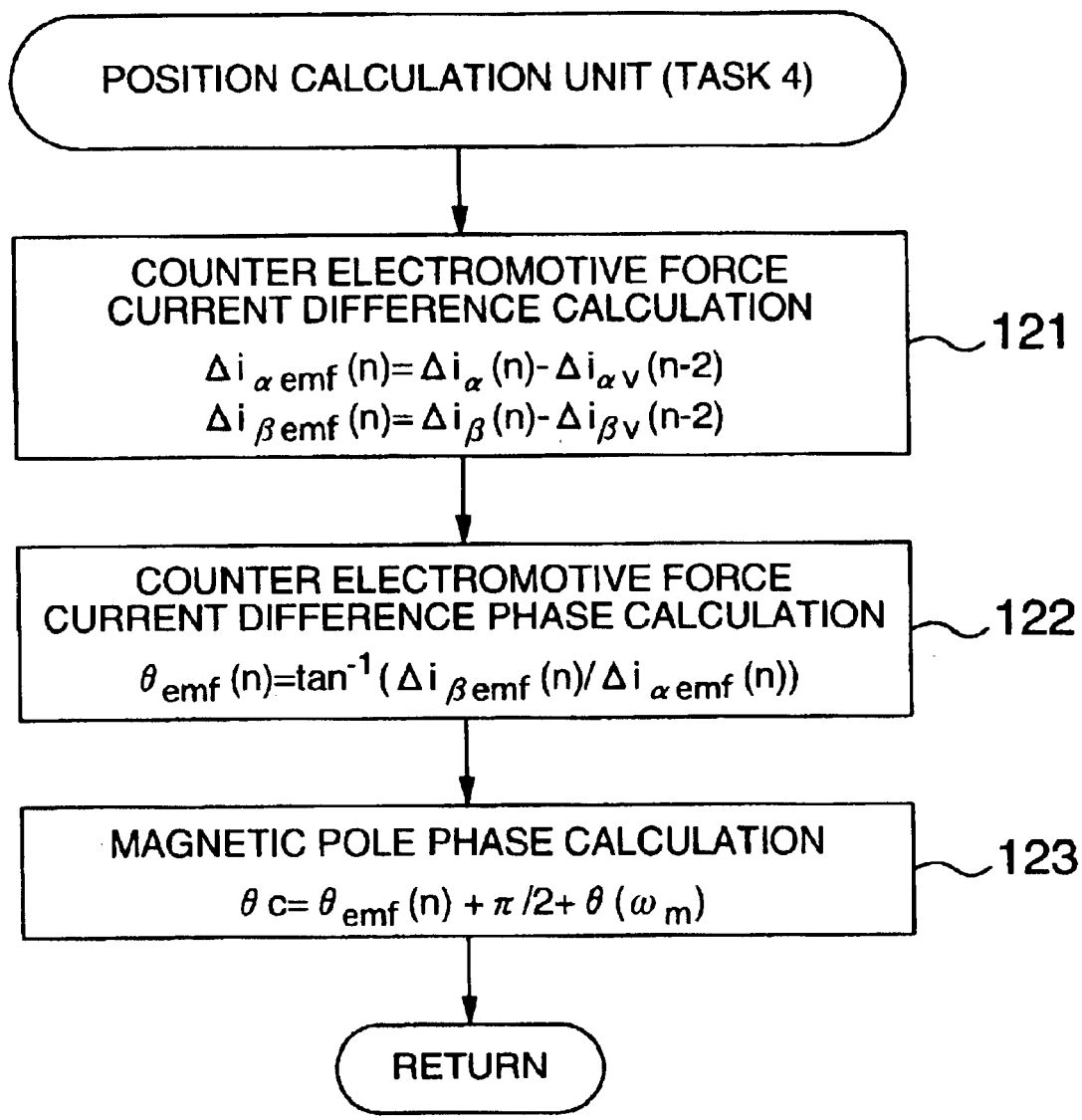
FIG. 7 is a flowchart showing processes performed by a position sensing unit of FIG. 1.

FIG. 5 shows processes performed in the current difference calculation unit; FIG. 6 shows processes performed in the current difference sensing unit 14; and FIG. 7 shows processes performed in the position sensing unit 15. Moreover, calculation timings of the current difference calculation unit 13, the current difference sensing unit 14, and position sensing unit 15 are shown in task 2, task 3, and task 4 in FIG. 4, respectively. It should be noted that task 1 of FIG. 4 performs processes of the current instruction generation unit 6, the current control unit 7, the coordinate conversion unit 8, and the PWM generation circuit 9. After the voltage instruction of each phase to be applied is decided and the PWM waveform of the next section is set, processes of task 2, task 3, and task 4 are performed in this order.

Firstly, explanation will be given on the calculation of the current difference calculation unit 13 (task 2) in section (n) with reference to FIG. 5. In step 101, voltage instruction values Vur(n), Vvr(n), and Vwr(n) of the respective phases calculated in task 1 are input and the $\alpha$-axis voltage instruction value V$\alpha$r(n) and $\beta$-axis voltage instruction value V$\beta$r(n) are calculated by calculation of the 3 phases/2 phases conversion. In step 102, in order to obtain the $\alpha$-axis voltage value V$\alpha$(n) and $\beta$-axis voltage value V$\beta$(n) which are actually applied to the synchronous motor 1, the battery voltage VB is input and Equations (4) and (5) are calculated for the reference battery voltage VB0.

$$V\alpha(n) = V\alpha r(n) \cdot (VB/VB0) \quad (4)$$

$$V\beta(n) = V\beta r(n) \cdot (VB/VB0) \quad (5)$$

After performing such a correction, in step 103, the α-axis voltage current difference Δiαv and the β-axis voltage current difference Δiβv are calculated by Equations (6) and (7), respectively.

$$\Delta i\alpha V(n) = V\alpha(n) \cdot \Delta t / L \quad (6)$$

$$\Delta i\beta V(n) = V\beta(n) \cdot \Delta t / L \quad (7)$$

Since the voltage instruction values Vur(n), Vvr(n), and Vwr(n) calculated in the section (n) are actually applied to a section (n+1), the average values of the α-axis voltage current difference Δiαv and the β-axis voltage current difference Δiβv in section (n+1) become the α-axis voltage current difference Δiαv(n) and the β-axis voltage current difference Δiβv(n). These values the α-axis and β-axis components of the applied voltage current difference vector Δiv of the first term in the right side of Equation (3). The result is input to the position sensing unit 15.

Next, explanation will be given on the calculation of the current difference sensing unit 14 (task 3) in section (n) with reference to FIG. 6. Firstly, in step 111, the current sensing unit 10 acquires iu(n) and iv(n) at time t(n) and 2-phase/3-phase conversion calculation is performed to obtain α-axis current iα(n) and β-axis current iβ(n). In step 112, the current difference sensing unit 14 calculates the difference between the α-axis current iα(n) and α-axis current iα(n−1) calculated for the preceding section (n−1) and the difference between the β-axis current iβ(n) and β-axis current iβ(n−1) calculated for the preceding section (n−1) by Equations (8) and (9), respectively.

$$\Delta i\alpha(n) = i\alpha(n) - i\alpha(n-1) \quad (8)$$

$$\Delta i\beta(n) = i\beta(n) - i\beta(n-1) \quad (9)$$

These values represent the α-axis and β-axis components of the current difference vector Δi of the left side of Equation (3). This result is input to the position sensing unit 15.

Next, explanation will be given on the calculation of the position sensing unit 15 in section (n) (task 4) with reference to FIG. 7. Firstly, in step 121, the -axis component Δiαemf(n) and the -axis component Δiβemf(n) of the counter electromotive force current difference vector Δiemf are calculated according to the relationship of Equation (3) by Equations (10) and (11), respectively.

$$\Delta i\alpha \text{emf}(n) = \Delta i\alpha(n) - \Delta i\alpha V(n-2) \quad (10)$$

$$\Delta i\beta \text{emf}(n) = \Delta i\beta(n) - \Delta i\beta V(n-2) \quad (11)$$

It should be noted that calculation timings of the current difference vectors used in Equation (10) and (11) are different. That is, the α-axis current difference Δiα(n) and the β-axis current difference Δiβ(n) are results of calculation in the section (n) but actually the values correspond to the section (n−1). In contrast to this, the α-axis voltage current difference ΔiαV(n−2) and the β-axis voltage current difference ΔiβV(n−2) are results obtained in task 2 of the section (n−2). This is because these voltage current differences are based on the voltage instruction values Vur(n−2), Vvr(n−2), and Vwr(n−2) of the respective phases applied in section (n−1). In this embodiment, attention is paid on the point that the α-axis current difference Δiα(n) and the β-axis current difference Δiβ(n) are values of the section (n−1) preceding the section (n) by one and on the point that the voltage current difference is based on the voltage instruction values Vur(n−2), Vvr(n−2), and Vwr(n−2) of the respective phases applied in section (n−1) preceding (n−2) by one, and calculations of Equations (10) and (11) are performed by using current difference vectors of different calculation timings.

Thus, in this embodiment, calculation is performed by accurately considering the calculation timing of the current difference vector. Accordingly, even if the voltage instruction changes in steps, it is possible to eliminate affects to the α-axis component Δiαemf and the β-axis component Δiβemf of the counter electromotive force current difference vector Δiemf in the section (n−1) without using a low-pass filter or the like and to improve response of the motor control apparatus. Moreover, in this embodiment, since there is no need of using a low-pass filter or the like, it is possible to sense the magnetic pole position in a short time even when the load is suddenly changed. Moreover, in this embodiment, even when the voltage applied is changed suddenly, it is possible to eliminate the affect of the current difference caused by the change. Accordingly, this embodiment can provide a position sensor-less control method that can preferably be applied to a motor control system requiring a high transient response.

Next, in step 122, the phase θemf(n) of the counter electromotive force current difference vector Δiemf is calculated by Equation (12) using the values of the α-axis component Δiαemf(n) and the β-axis component Δiβemf(n) of the counter electromotive force current difference Δiemf calculated in step 121.

$$\theta \text{emf}(n) = \tan^{-1}(\Delta i\beta \text{emf}(n) / \Delta i\alpha \text{emf}(n)) \quad (12)$$

The phase θemf(n) indicates the phase of the direction (negative direction of the q-axis) of the counter electromotive force vector Vemf in FIG. 2. Furthermore, in step 123, Equation (13) is calculated to obtain the magnetic pole position θc (d-axis direction).

$$\theta c = \theta \text{emf}(n) + \pi/2 + \theta(\omega m) \quad (13)$$

wherein θc represents a magnetic pole position obtained by calculation and θ represents an actual magnetic pole position in FIG. 2. As is clear from FIG. 2, the magnetic pole position θ is a phase advancing by π/2 with respect to the counter electromotive force vector Vemf and this is added as the second term of the right side of Equation (13). Moreover, if thinking temporally, θemf(n) is an average phase of the section (n−1) shown in FIG. 4 (phase of almost the middle point of the section (n−1)). If this is used, the timing for performing the coordinate conversion is task 1 of the section (n+1) shown in FIG. 4. The voltage instruction values Vur(n+1), Vvr(n+1), and Vwr(n+1) of the respective phases obtained by this are output as the PWM signal at the timing of section (n+2). The rotor of the synchronous motor 1 rotates according to the motor speed ωm during this time and this should be taken into consideration. The correction term for this is the third term of the right side of Equation (13). The correction amount is decided by the calculation dead time and the motor speed. Accordingly, when the order to the calculation tasks shown in FIG. 4 is modified, the affect can be considered in the decision. The magnetic pole position θc thus obtained is used in the calculation in the coordinate conversion units 8, 11. Moreover, the magnetic pole position θc is input to a speed sensing unit 16. The speed sensing unit 16 calculates the motor speed ωm from the changed state of the magnetic pole position θc.

As has been described above, the present embodiment is characterized in that a magnetic pole position is estimated from counter electromotive force by digital timing matched calculation of voltage applied and the corresponding current change. This eliminates necessity of using filter processing such as the observer and the simulator and can enhance response as compared to the conventional one.

The motor control apparatus according to the present embodiment is especially preferable for controlling the motor with a high response in the intermediate speed range to the high speed range of the motor for which a counter electromotive force can be measured. By using the apparatus in combination with a motor control apparatus capable of controlling the motor with a high response in the low speed range of the motor, it is possible to control the motor with a high response over the entire range of the motor from the low speed range to the high speed range.

Moreover, in the drive system including the motor control apparatus of the present embodiment, for example in a hybrid electric automobile drive system for driving a vehicle by switching between an engine as an internal combustion engine and a synchronous motor as an AC motor serving as drive sources, it is possible to improve the drive efficiency in the intermediate speed range and the high speed range. Moreover, in an electric automobile using only a motor as a drive source, improvement of drive efficiency prolongs the distance that can be traveled by one charging. Moreover, in the drive system using the motor control apparatus of the present embodiment, acceleration requested by a driver can also be answered with a high response, which improves the operation efficiency of the drive system. Moreover, in the drive system using the motor control apparatus of the present embodiment, no position sensor is required for sensing the magnetic pole position of the rotor of the synchronous motor. This can reduce the cost of the drive system.

Figure 8:
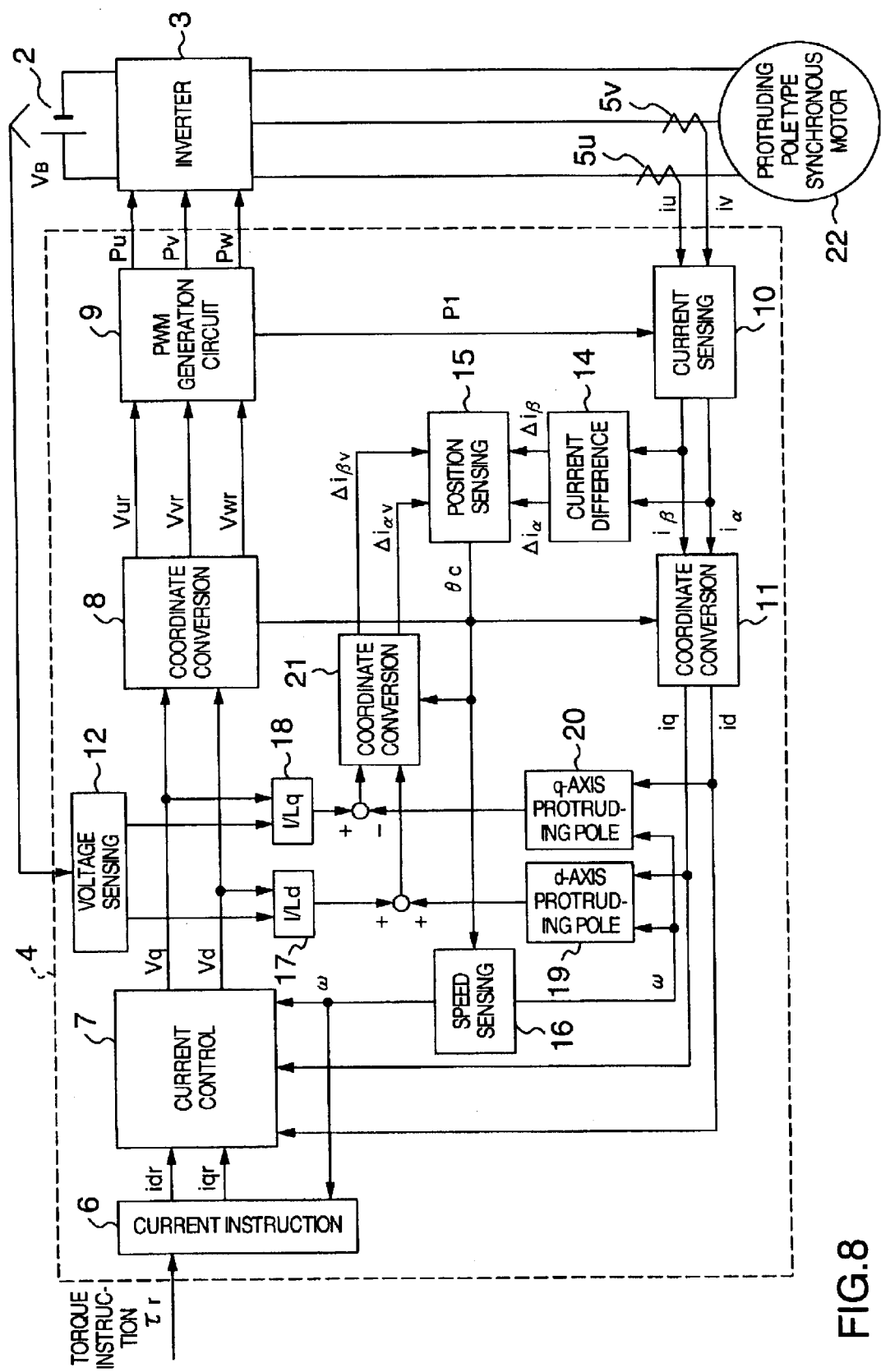
FIG. 8 is a block diagram showing system configuration of a motor control apparatus according to a second embodiment of the present invention, i.e., a control system example for performing torque control of a synchronous motor having a salient pole with high efficiency without using a position sensor.

FIG. 8 shows system configuration of a motor control apparatus according to a second embodiment. In this embodiment, the synchronous motor 1 having the salient pole is used as the synchronous motor 22. For this, in this embodiment, instead of the current difference calculation unit 13 for calculation in the still coordinate system in the first embodiment, the calculation result of the d-q-axis coordinate system which is a rotary coordinate system is converted by coordinate conversion into a still coordinate system so as to obtain α-axis voltage current difference Δiβv(n) and β-axis voltage current difference Δiβv(n). More specifically, the d-axis voltage instruction Vdr obtained in the current control unit 7 is supplied to a d-axis application voltage current difference calculation unit 17 and the q-axis voltage instruction Vqr is supplied to a q-axis application voltage current difference calculation unit 18. The d-axis application voltage current difference Δidv(n) and the q-axis application voltage current difference Δiqv(n) are calculated by Equations (14) and (15), respectively.

$$\Delta idV(n)=Vd(n)\cdot \Delta t\cdot (VB/VB0)/Ld \qquad (14)$$

$$\Delta iqV(n)=Vq(n)\cdot \Delta t\cdot (VB/VB0)/Lq \qquad (15)$$

As has been described in the first embodiment, correction is made for the voltage fluctuation of the battery 2 so as to correspond to the voltage actually applied. In this embodiment also, a correction term (VB/VB0) is added but this can be removed when the battery voltage fluctuation is small. In the case of an AC motor having a non-salient pole characteristic such as a cylindrical synchronous motor, the d-axis application voltage current difference Δidv(n) and the q-axis application voltage current difference Δiqv(n) obtained here can be subjected to a coordinate conversion by the coordinate conversion unit 21 from the d-q-axis coordinate system to a still coordinate system so as to calculate the α-axis voltage current difference Δiαv(n) and the β-axis voltage current difference Δiβv(n). However, in the case of the synchronous motor 22 having the salient pole, affect from the salient pole should be taken into consideration. The calculation unit for compensating this is a d-axis salient pole calculation unit 19 and a q-axis salient pole calculation unit 20. The d-axis salient pole calculation unit 19 is supplied with the q-axis current iq and the motor speed ωm and calculates the d-axis salient pole current difference Δidp(n) by Equation (16).

$$\Delta idp(n)=(Lq-Ld)\omega m\Delta t/Ld \qquad (16)$$

The q-axis salient pole calculation unit 20 is supplied with the d-axis current id and the motor speed ωm and calculates the q-axis salient pole current difference Δiqp(n) by Equation (17).

$$\Delta iqp(n)=(-Lq+Ld)\omega m\Delta t/Lq \qquad (17)$$

When the salient pole type synchronous motor rotates, if characteristic is viewed from one direction of the still coordinate system, the inductance changes and the current flow becomes easy and difficult. This causes a current change. The characteristic is the d-axis salient pole current difference Δidp(n) and the q-axis salient pole current difference Δiqp(n). Accordingly, by adding the d-axis salient pole current difference Δidp(n) to the d-axis application voltage current difference Δidv(n) and subtracting the q-axis salient pole current difference Δiqp(n) from the q-axis application voltage current difference Δiqv(n), it is possible to obtain a current difference considering the affect of the applied voltage and the salient pole. The current difference obtained by the calculation is coordinate-converted by the coordinate conversion unit 21 into a still coordinate system. Thus, it is possible to calculate the α-axis voltage-current difference Δiαv(n) and the β-axis voltage current difference Δiβv(n) considering the salient pole of the synchronous motor 22. The α-axis voltage current difference Δiαv(n) and the β-axis voltage current difference Δiβv(n) thus calculated are input to the position sensing unit 15 and the magnetic pole position θc is calculated by the processing method described in the first embodiment.

According to this embodiment, even when the AC motor has a salient pole, it is possible to enhance the response of the motor control apparatus. Accordingly, in this embodiment also, it is possible to provide a position sensor-less control method that can preferably be applied to a motor control system requiring a high transient response.

In the description of the embodiments of the present invention, explanation has been given on a method calculating the magnetic pole position of the rotor of the synchronous motor by using an output from a current sensor sensing two-phase current of the synchronous motor without using a position sensor. It is also possible to obtain the magnetic pole position of the rotor of the synchronous motor by using an output from a current sensor sensing three-phase current of the synchronous motor. Moreover, in the description of the embodiments of the present invention, explanation has been given on a case when the AC motor is a synchronous motor having a salient pole and on a case when the AC motor is a cylindrical synchronous motor. However, the motor control apparatus of the present invention can also be applied to an induction motor by obtaining a counter electromotive force by a magnetic flux established by the primary current. Moreover, in the description of the embodiments, an example has been given on the control system for the torque instruction. However, the motor control apparatus of the present invention can also be applied to a control system having a speed control system for the speed instruction or a control system constituting a position control system.

According to the embodiments of the present invention, the magnetic pole position of the rotor of the synchronous motor is estimated according to a counter electromotive force estimated, and according to the estimated magnetic pole position, voltage applied to the AC motor from the power converter is controlled. Accordingly, it is possible to control the AC motor with a high response without using a position sensor. Consequently, according to the embodiments of the present invention, it is possible to provide motor control apparatus and control method capable of controlling an AC motor with a high response without using a position sensor. Moreover, according to the embodiments of the present invention, it is possible to provide a motor control apparatus and control method capable of controlling an AC motor having a salient pole with a high response without using a position sensor. Furthermore, according to the embodiments of the present invention, it is possible to provide a motor control apparatus and control method capable of increasing the drive efficiency in the intermediate speed range and the high speed range of a drive system using an AC motor.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A motor control apparatus comprising a power converter for applying voltage to an AC motor and a control apparatus for controlling the voltage applied, said control apparatus including: current change sensing means for sensing a current change of the AC motor, current change calculation means for calculating a current change attributed to the voltage applied, and counter electromotive force estimation means for estimating a counter electromotive force direction according to the current change sensed by the current change sensing means and the current change calculated by the current change calculation means, wherein the voltage applied is controlled according to the counter electromotive force direction estimated by the counter electromotive force estimation means.

2. The motor control apparatus as claimed in claim 1, wherein the control apparatus has correction means for correcting the current change calculated by the current change calculation means according to an input voltage of the power converter.

3. A motor control apparatus comprising a power converter for applying voltage to a protruding pole type synchronous motor and a control apparatus for controlling the voltage applied, said control apparatus including: current change sensing means for sensing a current change of the synchronous motor, current change calculation means for calculating a current change attributed to the voltage applied and a current change attributed to inductance changed by rotation of the synchronous motor, and counter electromotive force estimation means for estimating a counter electromotive force direction according to the current change sensed by the current change sensing means and the current change calculated by the current change calculation means, wherein the voltage applied is controlled according to the counter electromotive force direction estimated by the counter electromotive force estimation means.

4. The motor control apparatus as claimed in claim 3, wherein the control apparatus has correction means for correcting the current change calculated by the current change calculation means according to an input voltage of the power converter.

5. The motor control apparatus as claimed in claim 1, wherein the current change sensing means senses a current change at a timing when the affect of current change changed by the power converter switching operation is removed.

6. The motor control apparatus as claimed in claim 1, wherein the current change calculation means calculates a current change by receiving an application voltage instruction calculated before sensing the current change by the current change sensing means.

7. A motor control method for controlling an AC motor by controlling voltage applied to the AC motor from a power converter, wherein a current change of the AC motor is sensed, a current change attributed to the voltage applied is calculated, and a counter electromotive force direction is estimated according to the current change of the AC motor sensed and the current change attributed to the applied voltage calculated, so that the applied voltage is controlled according to the estimated counter electromotive force direction.

8. The motor control method as claimed in claim 7, wherein the current change attributed to the applied voltage is corrected according to an input voltage of the power converter.

9. The motor control method as claimed in claim 7, wherein a current change of the AC motor is sensed at a timing when the affect of current change changed by the power converter switching operation is removed.

10. The motor control method as claimed in claim 7, wherein a current change attributed to the applied voltage is calculated by receiving an instruction calculated before sensing the current change of the AC motor.

11. A motor control method for controlling voltage applied to a protruding pole type synchronous motor from a power converter, thereby controlling the synchronous motor, the method comprising steps of: sensing a current change of the synchronous motor, calculating a current change attributed to the voltage applied, calculating a current change attributed to inductance changed by rotation of the synchronous motor, and estimating a counter electromotive force direction according to the sensed current change of the synchronous motor, the calculated current change attributed to applied voltage, and the calculated current change attributed to the inductance, thereby controlling the applied voltage according to the estimated counter electromotive force direction.

12. The motor control method as claimed in claim 11, wherein the current change attributed to the applied voltage is corrected according to an input voltage of the power converter.

13. The motor control method as claimed in claim 11, wherein a current change of the synchronous motor is sensed at a timing when the affect of current change changed by the power converter switching operation is removed.

14. The motor control method as claimed in claim 11, wherein a current change attributed to the applied voltage and a current change attributed to the inductance are calculated by receiving an instruction calculated before sensing the current change of the synchronous motor.

* * * * *